July 13, 1948.   I. WOLFF   2,445,014

VIBRATORY MECHANICAL SYSTEM

Filed Nov. 29, 1943

OPENS   CLOSES

Inventor
Irving Wolff
By C. D. Tuska
Attorney

Patented July 13, 1948

2,445,014

UNITED STATES PATENT OFFICE 2,445,014

VIBRATORY MECHANICAL SYSTEM

Irving Wolff, Princeton, N. J., assignor to Radio Corporation of America, a corporation of Delaware Application November 29, 1943, Serial No. 512,153

12 Claims. (Cl. 318—9)

This invention relates to vibratory mechanical systems and the like, and more particularly to the production of any predetermined motion in a vibratory system, such as a diaphragm. Mechanical systems generally exhibit the characteristics of mass, stiffness, and resistance. These properties affect the motional response of the system to an applied force in accordance with the equation:

(1) $$f = s\int v\,dt + rv + m\frac{dv}{dt}$$

where $f$ is the applied force, $v$ is the instantaneous velocity, $m$ is the mass, $r$ is a factor which correlates the velocity and rate of energy loss, and $s$ is the stiffness. The quantities $v$, $m$, $r$, and $s$ are effective values referred to the point of application of the force, $f$. It is evident that the velocity, $v$, is not a linear function of the force, $f$, but is determined also by the mass, $m$, and the stiffness, $s$.

It is the principal object of this invention to provide a method of and means for producing motion in a mechanical system in response to an applied force, such that the motion will be a predetermined function of the time, independently of the mass and stiffness of said system.

Another object is to provide a method of and means for neutralizing or compensating the effects of mass, stiffness, and resistance upon the response of a mechanical system so as to obtain a desired motion.

Another object is to provide a method of and means for producing the force required to cause motion of a mechanical system as a predetermined function of time.

A further object of the present invention is to provide an improved method of and means for effecting linear, triangular wave, frequency modulation of a radio transmitter for radio distance measuring and the like.

Still another object of this invention is to provide an improved method of and means for generating, in response to a square wave voltage, energizing current for coil driven vibrator type capacitor modulating units, said current having the peculiar wave shape necessary to compensate the effects of the mass and stiffness of the vibrating elements of such units, so as to obtain linear triangular wave motion.

Figure 2:
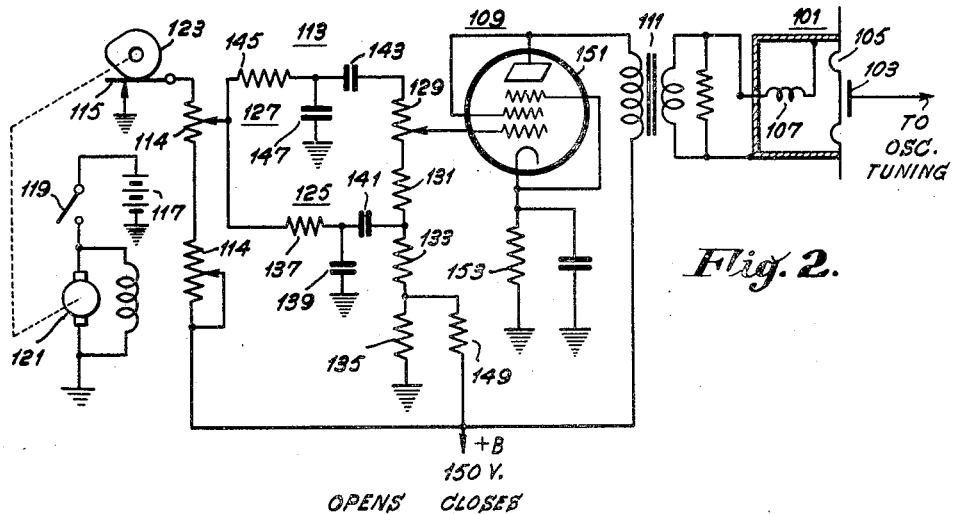
Figure 3:
Figure 4:
Figure 5:
Figure 6:
Figure 1:
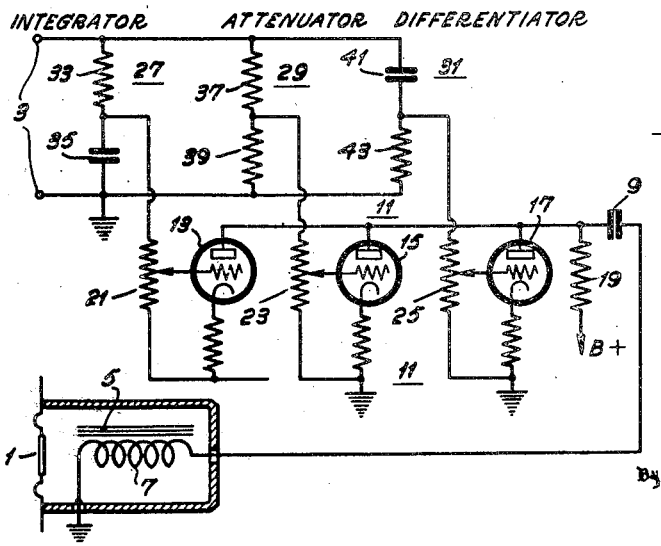

The above and other objects will become apparent to those skilled in the art upon consideration of the following specification, with reference to the accompanying drawing, of which Figure 1 is a schematic circuit diagram of a system for actuating a diaphragm in response to a signal voltage in accordance with the invention, Figure 2 is a schematic circuit diagram of a frequency modulator system embodying the invention, Figure 3 is a graph of a square wave voltage employed in the operation of the system of Figure 2, Figures 4 and 5 are graphs of voltages derived from said square wave voltage in the operation of the system of Figure 2, and Figure 6 is a graph of the wave applied to the actuating coil of the vibrating capacitor unit of Figure 2. Let us suppose that a certain motion $v(t)$ is desired. If the displacement is zero at time zero, the displacement at any other time is given by $\int v\,dt$ and the acceleration by $dv/dt$.

If forces are applied to overcome simultaneously the stiffness, resistance to motion and inertia effects which would be encountered in obtaining the desired motion, the motion $v(t)$ would result. These forces are respectively as follows:

(2) $\qquad f_s = s \cdot \text{displacement} = s\int v\,dt$ (3) $\qquad f_r = r \cdot \text{velocity} = rv$ (4) $\qquad f_m = m \cdot \text{acceleration} = m\dfrac{dv}{dt}$ The force $f$ to obtain the motion $v(t)$ is, therefore, (5) $$f = f_s + f_r + f_m = s\int v\,dt + rv + m\frac{dv}{dt}$$

The invention will be described with reference to an electromechanical system, such as a diaphragm arranged to be actuated by an electromagnet to which the driving force, $f$, is applied in the form of a varying electric current. Referring to Figure 1, a diaphragm 1 is to be driven with instantaneous velocity, $v(t)$ by means including an electrodynamic winding 7. The winding is connected to the output of an amplifier 11. The amplifier 11 comprises three electron discharge tubes 13, 15, and 17 provided with a common load resistor 19 and separate input resistors 21, 23 and 25 respectively. The resistor 19 should be low compared to the plate impedance of tubes 21, 23 and 25. The resistors 21, 23 and 25 are provided with adjustable taps for controlling the voltages applied to the input of the tubes 13, 15 and 17.

The input terminals 3 are connected to networks 27, 29 and 31. The network 27 comprises a resistor 33 and a capacitor 35, so proportioned that their RC product, or time constant, is relatively large with respect to the longest period of variation of input voltage which is to be encountered in the operation of the system. The input resistor 21 is connected across the capacitor 35 and has a resistance which is relatively high with respect to that of the resistor 33. The network 29 comprises a pair of resistors 37 and 39 connected as a voltage divider. The input resistor 23 is connected across the resistor 39 and is high compared to 39. The network 31 comprises a capacitor 41 and a resistor 43, so proportioned that their RC product is relatively small with respect to the shortest period of variation of the input voltage which is to be encountered in the operation of the system. The input resistor 25 is connected across the resistor 43, and has a resistance which is relatively high with respect to that of the resistor 43.

The operation and adjustment of the above described system is as follows:

Variations in the input voltage applied from the terminals 3 to the network 27 cause variations in the voltage across the capacitor 35 which are substantially the time integral of the input voltage variations. This results from the fact that the current, $i$, in the capacitor 35 is determined almost entirely by the voltage, $e$, at the input terminals 3 and the resistance, R, of the resistor 33:

(6) $$i = \frac{e}{R}$$

The charge in the capacitor 35 at any time is (7) $$Q = \int i\, dt = \frac{1}{R}\int e\, dt$$

The voltage $e_1$, across the capacitor 35 is (8) $$e_1 = \frac{Q}{C} = \frac{1}{RC}\int e\, dt$$

An adjustable portion of the integral voltage, $e_1$, is applied to the control grid of the tube 13 through the voltage divider 21.

A portion of the input voltage, $e$, appears across the resistor 39 of the network 29. This is applied to the control grid of the tube 15 through the voltage divider 25.

The current through the network 31, and hence the voltage drop appearing across the resistor 43, is substantially entirely determined by the charging and discharging currents flowing in the capacitor 41. With a small RC product as described above, substantially the entire input voltage, $e$, appears across the capacitor 41. The charge at any time of the capacitor 41 is thus substantially (9) $$Q' = C'e$$

where $C'$ is the capacitance. Since

(10) $$Q = \int i'\, dt$$

where $i'$ is the charging current,

(11) $$i' = \frac{dQ}{dt} = C'\frac{de}{dt}$$

the voltage $e_3$, appearing across the resistor 43 is thus

(12) $$e_3 = R'C'\frac{de}{dt}$$

where $R'$ is the resistance of the resistor 43. An adjustable portion of the voltage, $e_3$, is applied to the control grid of the tube 17 through the voltage divider 25.

The inputs to the tubes 13, 15, 17 are amplified and applied to the common load resistor 19, producing a voltage drop across said resistor which is substantially proportional to the sum of the input voltages, providing the resistance of the resistor 19 is relatively low with respect to the internal impedances of the tubes 13, 15, 17. If the resistance of coil 7 is also low compared to the impedance of these tubes the current through it will be proportional to this same sum.

By adjusting the dividers 21, 23 and 25 as will be shown and by applying a voltage

(13) $$e(t) = k \cdot v(t)$$

where $v(t)$ is the desired motion of diaphragm 1, $k$ is a constant and $e(t)$ is applied to terminal 3, the desired motion of the diaphragm will be obtained. The force applied to the diaphragm if it were not moving would be $f_d = M i_c$, where M is a constant determined by the construction of the electrodynamic drive system and $i_c$ is the current through the coil. If the stiffness, resistance and mass coefficients of the system are $s$, $r$, and $m$, respectively, it has been shown previously that a force

(14) $$f = s\int v\, dt + rv + m\frac{dv}{dt}$$

will produce the motion $v(t)$. The current $i_c$ must, therefore, equal

(15) $$\frac{s\int v\, dt + rv + m\frac{dv}{dt}}{M}$$

The currents $i_1$, $i_2$, $i_3$ caused to flow in coil 7 by the voltages $e_1$, $e_2$ and $e_3$ impressed on the dividers 21, 23 and 25 are related as follows to those voltages

(16) $$i_1 = e_1 r_1$$

(17) $$i_2 = e_2 r_2$$

(18) $$i_3 = e_3 r_3$$

where $r_1$, $r_2$, and $r_3$ are determined by the adjustment of the dividers and the gain of the tubes 13, 15 and 17. From Equations 8 and 12

(19) $$i_c = i_1 + i_2 + i_3 = \frac{r_1}{RC}\int e\, dt + er_2 + r_3 R'C'\frac{de}{dt}$$

Comparing (15) and (19) we see that if

(20) $$e = kv$$

and if

(21) $$r_1 = \frac{RCs}{KM}$$

(22) $$r_2 = \frac{r}{KM}$$

and

(23) $$r_3 = \frac{m}{KMR'C'}$$

the desired current and, therefore, the desired motion is obtained.

One important application of the invention is in modulation in radio distance measuring devices, such as FM altimeters and the like. FM altimeters are well known, such altimeters being described in Bentley Patent 2,011,302 and in Espenschied Patent 2,045,071. In these systems a radio wave that is radiated to a reflecting surface or object is cyclically frequency modulated. In a receiver which is located close to the point of radiation the reflected signal is picked up and mixed or heterodyned with some of the frequency modulated signal received directly from the transmitter. The resulting difference frequency is a measure of the distance from the transmitter to the reflecting surface or object, since this frequency is determined by the time required for the radiated signal to reach the reflecting object and return to the receiver.

Practical experience has shown it to be desirable to employ a vibrating type modulating unit, preferably a capacitor device in which the capacity could be varied cyclically to vary correspondingly the transmitter frequency. A coil driven diaphragm unit of this type is described in copending U. S. application, Serial Number 471,003 filed January 1, 1943, by S. V. Perry and entitled Capacity modulator unit. Generally the variation of capacity with respect to time need not be linear, or in accordance with any other particular law, as long as it is cyclical. However, certain FM distance and speed measuring systems do require accurately linear triangular wave frequency modulation in order to perform properly the functions for which they are intended. While such modulation is obtainable with reactance tube modulators and the like, it is highly desirable, particularly in aircraft and other mobile applications, to retain the advantages of light weight, compactness, and simple construction characteristic of the vibrating diaphragm type unit. This choice, however, presents the problem of driving the diaphragm, with its physical properties of mass, resilience, and friction, so as to provide truly linear variation of capacitance with time.

Refer to Figure 2. A variable capacitor unit 1 of the type described in the aforementioned Perry application is provided with a stationary plate 103 coupled to the tuned circuit of an oscillator, not shown. A diaphragm 105 constitutes the movable capacitor electrode, which may be driven by suitable means, such as an electrodynamic drive. The drive is represented as a winding 107. Energy for the driving winding 107 is provided by a modulator amplifier 109, through a coupling transformer 111 designed to match the output impedance of the amplifier to the impedance of the winding 107.

The input circuit of the amplifier 109 includes a wave shape modification network 113, described more fully hereinafter and is connected to an intermediate tap on a voltage divider 114. One end of the voltage divider is connected to the positive terminal B+ of the anode potential supply (not shown) and the other end is connected through a switch 115 to ground. A battery 117 is connected through a switch 119 to a motor 121, preferably the motor section of a conventional dynamotor used to supply anode potential for the amplifier 9 and other equipment. The shaft of the motor 21 carries, or is mechanically coupled to a cam 123 for periodically operating the switch 115 to produce square wave impulses which are modified by the network 113, amplified by the amplifier 109, and applied to the actuating winding 107 of the variable capacitor device 101.

The network 113 includes an integrating section 125, a differentiating section 127, and a combining section comprising series connected resistors 129, 131, 133 and 135. The resistors 129, 131, 133 and 135 also function as a load or termination for the differentiating section 127. The integrating section 125 comprises a resistor 137 and a capacitor 139 connected in series between the switch 115 and ground. The values of the resistor 137 and the capacitor 139 are selected so that their RC product, or time constant, is long with respect to the period of one cycle of operation of the switch 115. A suitable modulation frequency is approximately 110 cycles per second. A coupling capacitor 141 is connected from the junction between the resistor 137 and the capacitor 139 to a point on the combining section between the resistors 131 and 133.

The differentiating network 127 includes a series capacitor 143 having a value with respect to that of the total resistance of the resistors 129, 131, 133, and 135 such that the RC product is small as compared to the period of operation of the switch 115. Also included in the network 127 is a series resistor 145 and a shunt capacitor 147, connected like the resistor 137 and the capacitor 139 of the integrating network. The function of these elements is described below.

A resistor 149 is connected between the point B+ and the junction between the resistors 133 and 135. The resistors 149 and 135 function as a voltage divider from which a positive bias voltage is applied to the control grid circuit of the electron discharge tube 151 of the amplifier 109. A self-bias resistor 153 is provided in the cathode circuit of the tube 151.

In the operation of the above described system, the switch 115, when closed, connects the voltage divider 114 between the point B+ and ground. The voltage at the tap of the voltage divider 114 is, therefore, somewhere between zero and the B+ potential, having a value dependent upon the adjustment of the tap. When the switch 115 is open, the full B+ potential is applied to the tap through the lower portion of the voltage divider 114. Thus as the switch 115 is opened and closed, the voltage applied to the network 113 is cyclically and discontinuously alternated between two definite values, providing a square wave form as illustrated in Figure 3.

As the switch 115 opens, the capacitor 139 starts to charge through the resistor 137. The increase of voltage across the capacitor 139 is substantially linear with respect to time during the period the switch 115 is open. When the switch 115 closes, the capacitor 139 starts to discharge through the resistor 137. since the voltage across it is higher than the voltage at the tap of the voltage divider 114. The decrease of voltage across the capacitor is also substantially linear with respect to time because the RC product of the resistor 137 and the capacitor 139 is large in relation to the period of operation of the switch 115. Accordingly the voltage across the capacitor 139 varies as shown by the graph of Figure 4, constituting a linear triangular wave.

The graph of Figure 4 is also representative of the form of the desired motion of the diaphragm 105 of the modulator unit 101 as a function of time. However, if the voltage across the capacitor 139 were applied to the actuating coil 107 without modification of wave shape, the motion of the diaphragm would not be a linear function of time, owing to inertia.

At each extreme of its excursion. the diaphragm tends to continue moving in the same direction after the driving force reverses. lagging the actuating current both during deceleration and acceleration and thereby producing a distorted wave of capacitance variation. In the practice of the instant invention, this effect is counteracted by predistorting the driving force by the addition of a sharp impulse at each reversal to overcome the momentum tending to cause continued motion in one direction and supply an opposite momentum to start motion in the reverse direction.

A preferred method of producing said impulses is by time differentiation of the square wave voltage of Figure 3, by the action of the capacitor 143 and the series resistors 129, 131, 133 and 135. Neglecting momentarily the effect of the resistor 145 and the capacitor 147, the capacitor 143 being relatively small, charges fully to the peak value of the applied square wave almost instantaneously upon opening of the switch 115. The short pulse of charging current, flowing through the resistors 129, 131, 133 and 135 causes a similar pulse of voltage at the input circuit of the amplifier 109. Upon closure of the switch 115, the capacitor 143 discharges through the same circuit, providing a voltage pulse of opposite polarity to the charging pulse. The pulse duration depends primarily upon the slopes of the leading and trailing edges of the square wave input to the capacitor 143, i. e., the length of the pulse is substantially the same as the time required for the square wave voltage to change from its minimum to maximum instantaneous value, and vice versa. It is found in practice that this pulse width may be too narrow to provide the desired operation of the system. The resistor 145 and the capacitor 147 are included to decrease the slopes of the edges of the square wave voltage before application to the capacitor 143, in order to widen the derived pulses. The resistor 145 and capacitor 147 operate in the same manner as the resistor 137 and the capacitor 139 of the integrating section 125, but to a much smaller extent.

The triangular wave voltage from the integrating section is applied through the capacitor 141 to the resistors 133 and 135, and the pulse train from the differentiating section appears across the resistors 129, 131, 133 and 135 as explained above. The resultant voltage at the tap of the resistor 129 contains components comprising both the triangular wave and the pulse train. The proportions of these components to each other is determined by the position of the tap. The input to the control grid of the amplifier tube 151 is of the form illustrated by the graph of Figure 6. The amplifier output wave is of the same shape but greater amplitude.

The relative amplitudes of the triangular wave and pulse components are adjusted by means of the voltage divider 129 so that the pulses just reverse the momentum of the diaphragm 105 at each end of its excursion, as described above. The amplitude of vibration of the diaphragm 105 may be adjusted by means of the voltage divider 114, which controls simultaneously the amplitudes of both components of the wave of Figure 6.

The invention is described as an improved method of and means for providing linear triangular wave capacity variation for FM radio distance measuring systems with a diaphragm type vibrating capacitor modulator. A square wave voltage is produced by means of a periodic switch and a source of D.-C. modified by an integrating network to triangular form, and applied to the actuating magnet of the capacitor unit. To overcome the effect of the inertia of the diaphragm upon linearity of operation of the modulator, a pulse train is derived from the square wave and added algebraically to the triangular wave, to offset the momentum at the end of each vibration of the diaphragm and supply opposite momentum at the beginning of each vibration.

I claim as my invention:

1. The method of driving a vibratory mechanical system having mass, stiffness, and mechanical resistance, with a velocity which is a predetermined function of time comprising the steps of producing separately, a force component bearing a linear relationship to said velocity, a second force component which varies substantially proportionally as the time integral of said velocity and a third force component which varies substantially proportionally as the time derivative of said velocity, and applying said second and third force components to said system in addition to said first force component.

2. The invention as set forth in claim 1 wherein the ratios between said force components are as $r:s:m$, respectively, where $r$ is the mechanical resistance of the system, $s$ is stiffness, and $m$ is the mass.

3. The method of producing a linear triangular wave vibratory motion of a mechanical system having mass, stiffness, and mechanical resistance which includes the steps of generating separately force components which are opposite to those caused by stiffness and mechanical resistance inherent in the system, generating short force pulse components at the instants of reversal of motion, and applying all of said force components to said system.

4. Apparatus for driving a mechanical system having mass, stiffness and resistance with velocity proportional to the instantaneous magnitude of a control voltage, including electromechanical transducer means coupled to said mechanical system, means for producing in response to said control voltage a first current linearly related to said control voltage, a second current bearing a predetermined ratio to the time integral of said control voltage and a third current bearing a predetermined ratio to the time derivative of said control voltage, and means for applying said currents to said transducer means.

5. The invention as set forth in claim 4 wherein the ratios between said currents $r:s:m$, respectively, where $r$ is the mechanical resistance of the system, $s$ is the stiffness, and $m$ is the mass.

6. Apparatus for driving a mechanical system having mass, stiffness, and resistance, with a velocity proportional to the instantaneous magnitude of a control voltage, including electromechanical transducer means coupled to said mechanical system, means for producing in response to said control voltage a first voltage linearly related to said control voltage, a second voltage bearing a predetermined ratio to the time integral of said control voltage, and a third voltage bearing a predetermined ratio to the time derivative of said control voltage, and means for applying said first, second and third voltages to said transducer means.

7. Apparatus for driving a mechanical system having mass, stiffness, and resistance with a velocity which is a predetermined function of time, including means for producing a voltage with instantaneous magnitude bearing a linear relationship to said velocity, electro-mechanical transducer means coupled to said mechanical system, means for producing in response to said voltage a first current linearly related to said voltage, a second current bearing a predetermined ratio of time integral of said voltage, and a third current bearing a predetermined ratio of time derivative to said voltage, and means for applying said currents to said transducer means.

8. In a frequency modulation radio distance measuring system including a vibrator type variable capacitor modulator device comprising a diaphragm and electro-mechanical transducer means for actuating said diaphragm, means for energizing said transducer means to cause the position of said diaphragm to vary as a linear triangular wave function of time, said energizing means comprising a source of substantially square wave form voltage, wave shape modification means connected to said source to produce from said square wave a voltage of linear triangular wave form, further wave shape modification means connected to said source to produce from said square wave a train of pulses coincident with the points of inflection of said triangular wave, means connected to both of said wave shape modification means for combining said triangular wave and said pulse train to produce a resultant wave, and means for applying said resultant wave to said transducer means.

9. In a frequency modulation radio distance measuring system including a vibrator type variable capacitor modulator device comprising a diaphragm and electric current responsive means for actuating said diaphragm, means for energizing said actuating means comprising a source of square wave voltage, voltage integrator means connected to said source to produce in response to said square wave voltage a voltage of triangular wave form, voltage differentiator means connected to said source to produce in response to said square wave voltage a train of voltage pulses, voltage combining means connected to said integrating means and to said differentiating means to produce a resultant voltage including said triangular wave and said pulse train as components, and means for applying said resultant voltage to said actuating means.

10. The invention as set forth in claim 8 wherein said actuating means comprises an electromagnet.

11. The method of driving a vibratory mechanical system having mass, stiffness, and mechanical resistance with an instantaneous velocity which is a predetermined function of time, comprising the steps of producing separately a force component linearly proportional to the product of said resistance and said velocity, a second force component linearly proportional to the product of said stiffness and the time integral of said velocity, and a third force component linearly proportional to the product of said mass and the time derivative of said velocity, combining said force components algebraically to produce a resultant force, and applying said resultant force to said system.

12. The method of driving a vibratory mechanical system having mass, stiffness, and mechanical resistance alternately from one position to another with a velocity which varies square wave fashion between a substantially constant positive value and an equal substantially constant negative value, comprising the steps of producing separately a force component directly proportional to the product of said resistance and said velocity, a second force component bearing the same proportionality to the product of said stiffness and the time integral of said velocity, and a third force component bearing the same proportionality to the product of said mass and the time derivative of said velocity, combining said force components algebraically to provide a resultant force, and applying said resultant force to said system.

IRVING WOLFF.